United States Patent Office 3,356,155
Patented Dec. 5, 1967

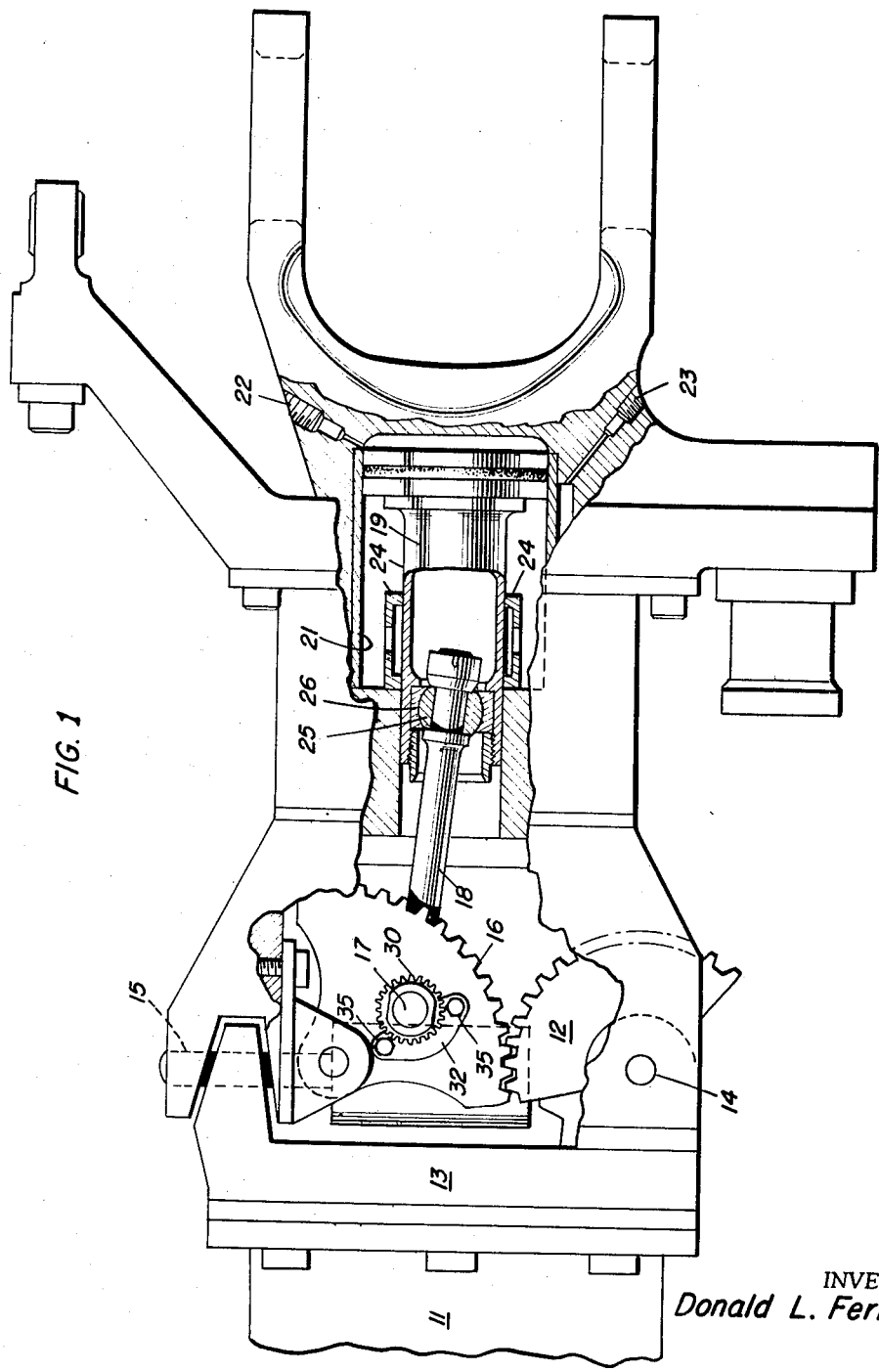

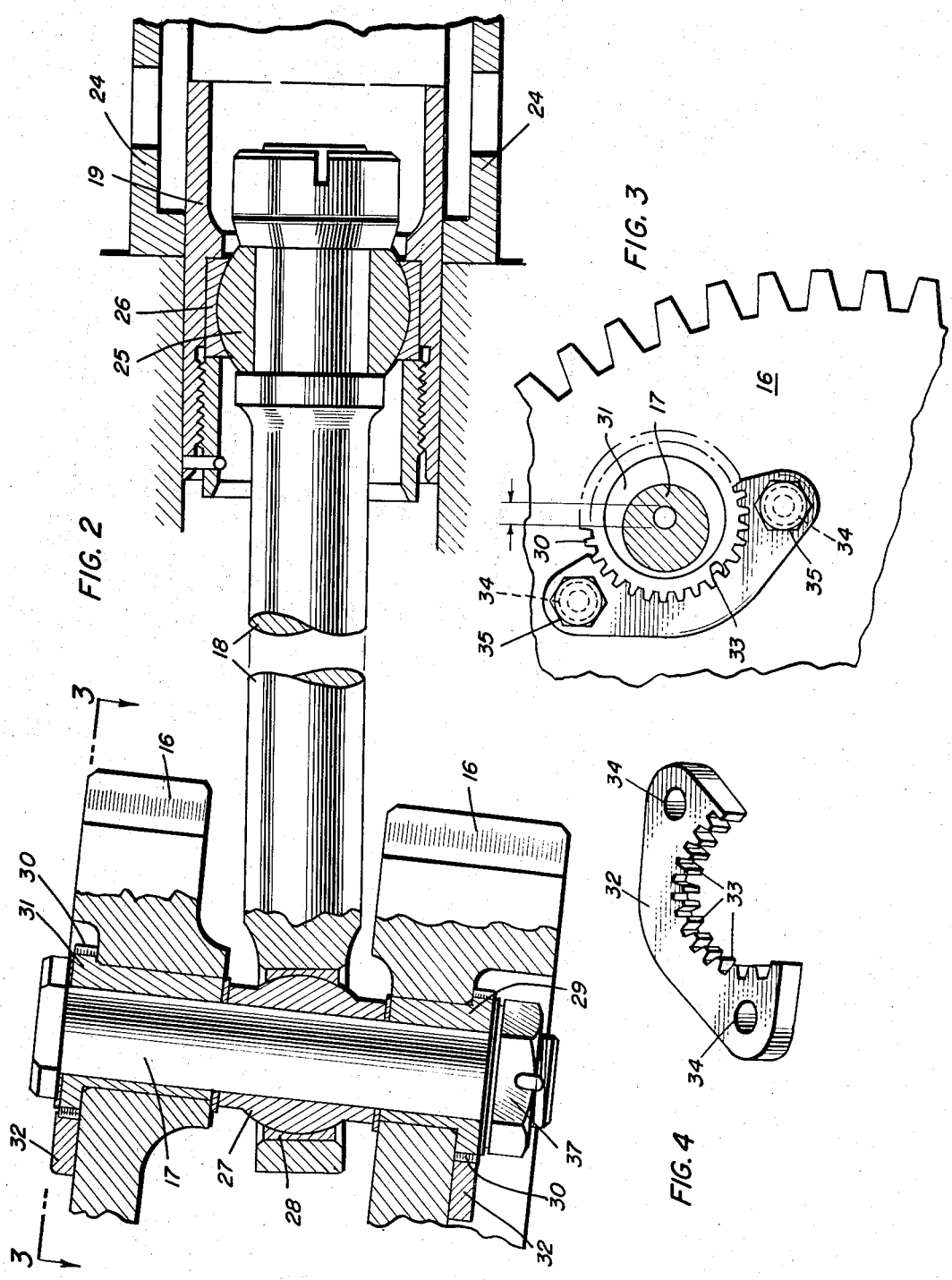

3,356,155
BLADE FOLD ADJUSTMENT AND LOCK
Donald L. Ferris, Newtown, Conn., assignor, by mesne assignments, to the United States of America as represented by the Secretary of the Navy
Filed July 29, 1965, Ser. No. 475,902
4 Claims. (Cl. 170—160.12)

This invention relates to a mechanism used in folding the blades of a helicopter rotor from an extended to a precise folded position and more particularly to that part of the mechanism relating to an eccentrically mounting means for a pivot pin connecting the operating piston with one pair of the meshed gear segments.

The folding of the blades of a helicopter rotor to a folded position so that the helicopters may be stored below decks on a carrier is a precise operation. The folded position must be such that the blades will be out of the way and the helicopters may be carried on elevators and yet be quickly and easily extended to open position after being brought on deck. The folded position is precisely located and the operating mechanism must be capable of an adjustment which will bring the operating piston against a stop firmly locking the blade against movement and precisely locate the folded blade.

It is an object of the present invention to provide means for mounting the connection between the operating piston and a pair of gear segments so that a precise adjustment may be made to vary the effective length of the rod connecting the piston with the gear segments.

It is another object of the present invention to provide a pin, used to pivotally connect the piston rod with one pair of the meshed gear segments and to so mount the pin in an eccentric bushing that an adjustment may be made which will vary the effective length of the piston rod.

It is still another object of the present invention to provide an eccentric bushing formed with an external, exposed splined outer wall which may be engaged and rotated to vary the effective length of a pivot pin supported by the bushing.

It is a further object of the present invention to provide means engaging the eccentric bushing for locking the bushing in adjusted position.

Other objects, advantages and novel features of the present invention will become apparent from the following detailed description of the invention when considered in conjunction with the accompanying drawings wherein:

FIG. 1 is a plan view, partly in section, of the mechanism for folding the blade of a helicopter;

FIG. 2 is a detail view of that part of the mechanism showing the mounting of the piston rod in the piston and its connection with the gear segments;

FIG. 3 is a detail, in elevation, of the pivot pin and the eccentric bushing and showing the locking means for the bushing; and FIG. 4 shows a perspective view of the locking means.

Referring to FIG. 1 of the drawings, a mechanism for folding the blades of a helicopter similar to that shown in Patent No. 3,097,701 is illustrated.

The helicopter blade, partly shown at 11, is attached to and rotatable with gear segments 12. The blade mounting 13 is pivoted on pin 14 and securely locked against folding by the hydraulically operated latch pin 15. The gear segments 12 may be one or more and are meshed with similar, in number, gear segments 16.

Attached to the gear segments 16 by means of a pivot pin 17, an operating piston rod 18 connects the gear segments 16 to an operating piston 19. The piston 19 is hydraulically operated within the cylinder 21 by hydraulic pressurized fluid entering and leaving the ports 22 and 23. The inner end of the piston engages a stop 24 carried within the cylinder 21 to limit the travel of the piston. Operation of this piston moves the gear segments 16 through a limited arc. This movement of the gear segments results in similar movement of the gear segments 12 which swing the released blade to folded position.

To accommodate the movement of the piston to the movement of the blade and to have both the piston at its stop engaging position and the blade folded to its precisely located folded position, it is necessary to provide means for adjusting the effective length of the operating piston rod.

The piston rod 18 is connected to the piston through a ball 25 and a socket 26 arrangement and to the pivot pin 17 by a similar arrangement of a ball 27 and socket 28. The pivot pin 17 supports the ball 27 and is itself supported by bushings 29 and 31 mounted in the gear segments 16. These bushings 29 and 31 are similar and are eccentrically mounted with respect to the pin 17 in the gear segments 16. They are formed with an exterior splined surface 30 which is exposed for ready availability. A locking segment 32 formed with teeth 33 fitting the splined surface of the bushing is secured to the gear segments 16. This locking segment 32 is provided with holes 34 which are of a greater diameter than bolts 35 which attach the locking segment to the gear segment 16 to provide adjustment so that the teeth of the locking segment may be firmly engaged wth the splined surface of the bushing before the bolts 35 are tightened.

In the helicopter blade folding adjusting operation the hydraulically operated piston functions to move the gear segments 16 and 12 to swing the blade to its precise folded position. At this time the piston is not against the stop 24. The pivot pin which is held in place by the nut 37 is loosened by turning nut 37 and the locking segment 32 is removed from the gear segment 16. The eccentric bushing is rotated to bottom the piston against the stop 24. With the piston bottomed against the stop 24 and the blade in its precise folded position the locking segment is placed in mesh with the splined surface of the bushing and the bolts 35 securely tightened. The securing of the pin 17 by tightening the nut 37 completes the operation of providing precise positioning of the folded blade of the helicopter.

Obviously many modifications and variations of the present invention are possible in the light of the above teachings. It is therefore to be understood that within the scope of the appended claims the invention may be practiced otherwise than as specifically described.

What is claimed is:

1. In a mechanism for folding helicopter blades from an extended to a precise folded position, said mechanism having meshed gear segments attached to the helicopter blade and to an operating piston, a mechanism for changing the effective length of a piston rod connecting the piston with the gear segments comprising
   a pivot pin eccentrically mounted in the gear segments and pivotally supporting the piston rod;
   means for rotating the eccentrically mounting means of the pin to change the effective length of the piston rod; and
   means for locking the eccentrically mounting means in adjusted position.

2. A mechanism according to claim 1 wherein the means eccentrically mounting the pivot pin is a pair of bushings.

3. A mechanism according to claim 1 wherein the means for rotating the eccentrically mounting means comprises an integrally formed splined outer surface.

4. A mechanism according to claim 1 wherein the locking means comprises a removable segment meshing with the means for rotating the eccentrically mounting means and secured to the gear segment and preventing rotation of the eccentrically mounting means.

No references cited.

EVERETTE A. POWELL, Jr., *Primary Examiner.*